JOHN A. JUST, OF SYRACUSE, NEW YORK, ASSIGNOR OF ONE-HALF TO D. H. BURRELL & COMPANY, OF LITTLEFALLS, NEW YORK.

METHOD OF MAKING CASEIN PHOSPHATE.

SPECIFICATION forming part of Letters Patent No. 692,454, dated February 4, 1902.

Original application filed June 10, 1901, Serial No. 63,996. Divided and this application filed September 30, 1901. Serial No. 77,137. (No specimens.)

*To all whom it may concern:*

Be it known that I, JOHN A. JUST, a citizen of the United States, and a resident of Syracuse, in the county of Onondaga and State of New York, have invented a new and useful Improvement in Methods of Making Casein Phosphate, of which the following is a specification.

The object of this invention is to produce a method of manufacturing a compound consisting of casein and phosphoric acid which is so acid in its action that it liberates a large percentage of gas from a gas-producing salt, such as bicarbonate of soda, and which is so stable and non-hygroscopic that it can be satisfactorily employed as the acid ingredient of baking-powder.

In practicing my invention I proceed as follows: The phosphoric acid which is employed may be produced in any well-known manner—for instance, by decomposing tricalcic or monocalcic phosphate by sulfuric acid, or it may be commercial phosphoric acid. The casein is produced in any suitable manner—for instance, by precipitating the curd from skim-milk by a suitable acid, separating the curd from the whey, and washing out the impurities. A caseinate, such as a compound of casein and an alkali or alkaline earth, may also be employed. I incorporate sufficient phosphoric acid with casein or a caseinate to insure sufficient acidity in the final compound. A satisfactory proportion is from twenty-three to twenty-five parts, by weight, of phosphoric acid to from seventy-seven to seventy-five parts of casein or approximately twenty-four parts, by weight, of phosphoric acid and seventy-six parts of casein or caseinate. I form an aqueous solution of phosphoric acid and introduce into the solution casein or caseinate to the amount of from twenty-five to fifty per cent., by weight, of the phosphoric acid contained in the solution. The mixture is heated until the curdy condition of the casein disappears and the mixture assumes a uniform fluid condition. It is then concentrated to a syrupy consistency. The remainder of the necessary amount of casein or caseinate is then added, and the ingredients are thoroughly mixed and united, preferably by grinding the mixture to a uniform moist mush-like consistency. The composition is then dried in a current of hot air or by other suitable means in such a way that the product is not discolored or injured and is ground to a fine powder. The intimate union of the phosphoric acid and casein during the gradual concentration of the mixture and during the grinding and drying thereof removes the changeable and hygroscopic qualities of the phosphoric acid and produces a dry and stable compound. The latter contains a much larger proportion of phosphoric acid than would be contained in acid phosphate of casein. This compound, which may be designated as a hyperphosphate of casein, yields, with its equivalent of bicarbonate of soda, about seventeen per cent. of gas and forms a very desirable acid ingredient for baking-powder. When mixed with water, it swells up and dissolves slowly.

I do not wish to claim in this application the herein-described acid ingredient or a baking-powder containing this acid ingredient, because said inventions are claimed in my application for Letters Patent, Serial No. 63,996, filed June 10, 1901, of which this application is a subdivision.

I claim as my invention—

1. The herein-described method of producing a compound of phosphoric acid and casein which consists in forming an aqueous solution of phosphoric acid, adding thereto part of the required amount of casein, concentrating the mixture to a syrupy consistency, adding the remainder of the casein, and thoroughly uniting the ingredients, substantially as set forth.

2. The herein-described method of producing a compound of phosphoric acid and casein which consists in forming an aqueous solution of phosphoric acid, adding thereto part of the required amount of casein, heating and concentrating the mixture to a syrupy consistency, adding the remainder of the casein, thoroughly uniting the ingredients, and drying the product, substantially as set forth.

Witness my hand this 21st day of September, 1901.

JOHN A. JUST.

Witnesses:
EDWARD WILHELM,
WILSON R. HARE.